United States Patent Office 2,940,178
Patented June 14, 1960

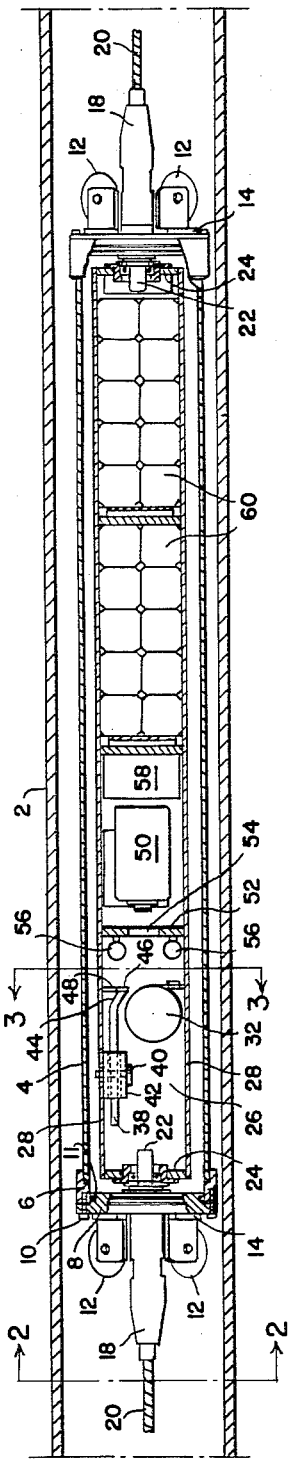

2,940,178

HORIZONTAL SURVEYING APPARATUS

William F. Krueger, Houston, Tex., assignor to Sperry-Sun Well Surveying Company, Philadelphia, Pa., a corporation of Delaware Filed Feb. 9, 1956, Ser. No. 564,457

1 Claim. (Cl. 33—205.5)

This invention relates to horizontal surveying apparatus and, more particularly, to apparatus for surveying pipe lines for the determination of horizontal and vertical deviations in the course of the pipe line.

Shifting of the earth under pipe lines frequently subjects the pipe lines to considerable stress. For example, if a pipe line extends under the bed of a river and the river washes out the earth below the pipe line, the pipe line will be subjected to deviations in position, producing loadings which may give rise to breakage of the pipe line. Deviations in the position of a pipe may also occur from other causes. Thus it is important to accurately check and record the horizontal and vertical position of the pipe line along its length at the time it is laid down and, thereafter, to check these positions at intervals in order to determine whether or not the position of the pipe line has changed at any location therealong in such a manner as to give rise to stresses within the pipe line which may result in failure of the pipe line.

It is the principal object of the present invention to provide a surveying instrument which may be drawn through a pipe line and which will provide records of the horizontal and vertical positions of the pipe at various locations along its length which may be compared with previously or subsequently made records.

This and other objects of the invention relating to details of construction and use thereof will become apparent from the following description when read in conjunction with the accompanying drawings, in which:

Figure 1 is a longitudinal section through a portion of a pipe line and an instrument positioned therein;

Figure 2 is an end view of the instrument and transverse section through the pipe line taken on the trace 2—2 indicated in Figure 1;

Figure 3 is a transverse section through the pipe line and through the instrument taken on the trace 3—3 shown in Figure 1; and Figure 4 shows a modified form of a fragmentary portion of the apparatus shown in Figure 1.

Referring to Figures 1–3 there is shown a pipe line 2 which is to be surveyed. Surveying apparatus is shown positioned therein and includes a tubular sleeve 4 having affixed thereto at each end a reinforcing band 6 which is affixed to a circular disc 8 by means of an array of bolts 10 and is maintained in sealed relation therewith by means of an O-ring 11 recessed in the disc 8. A plurality of wheels 12 are affixed to each disc 8 by means of suitable mounting brackets 14 and lie in radial arrangement with the radially outermost portion of each of the wheels extending radially outwardly of the band 6 and the disc 8. Thus, as viewed in Figure 2, the sleeve 4 and the end discs 8 will be supported within a pipe 2 by means of two of the wheels 12 at each end thereof engaging the pipe 2 as indicated at 16. The wheels are arranged to position the longitudinal axis of the sleeve 4 close to the longitudinal axis of the pipe.

Each of the end discs 8 has affixed thereto a swivel fitting 18 adapted to secure the end of a cable 20. These two cables may be employed to draw the apparatus through a portion of a pipe line in either direction as may be desired. Furthermore, by the use of two cables, the position of the instrument in a length of pipe line can always be accurately determined.

Affixed to each of the discs 8 and extending inwardly therefrom within the tubular sleeve 4 are trunnion pins 22. Each of the pins 22 supports a plate 24 pivotally mounted thereon by means of a suitable bearing assembly. Extending between and supported by the end plates 24 is a base plate 26 and a pair of side plates 28. The base plate 26, the end plates 24 and the side plates 28 form a cradle assembly supported from the trunnion pins 22 and serve to support inclination indicating and recording apparatus as will now be described.

A gyroscope assembly within a casing 30 is mounted within a suitable housing 32 in any conventional manner to provide for a suitable amount of dip or horizontal deviation between the gyroscope casing and the housing as required by the maximum slope expected in pipe lines or other horizontal bores to be surveyed. The axis of rotation of the gyroscope rotor extends substantially horizontally and the gyroscope construction is entirely conventional and need not be described in detail herein. The azimuthal positions, as indicated by the gyroscope, will be indicated on a moving gyroscope scale 34 and will be read by reference to a fixed scale 36 supported by casing 30. Positioned adjacent to the gyroscope housing 32 and supported by means of a plate 35 affixed to one of the side plates 28 is a clock 37 for indicating time.

A pendulous member 38 is positioned adjacent to the other of the side plates 28 and pivotally mounted by means of a pivot bolt 40 passing through the pendulous member and through a channel member 42 affixed to the side plate 28. The pendulous member 38 is provided at its right-hand end, as viewed in Figure 1, with an extending arm 44 which has affixed to the right-hand end thereof a vertically extending plate 46 carrying a scale the graduations of which are read in conjunction with a fixed graduated scale 48 attached to the adjacent side plate 28. It will be evident that upon movement of the pendulous member the movable scale 46 affixed thereto will move with reference to the fixed scale 48 and thus provide indications of vertical deviations of the instrument and of a pipe line within which the instrument is positioned.

The indicating scales of the gyroscope, the pendulous member and the clock face are all positioned to be in the focus of a motion picture camera 50. Positioned between the camera 50 and the various indicating scales is a plate 52 such as positioned between the side plates 28 and which is provided with a bore 54 positioned between the camera lens and the indicating scales to be photographed. The plate 52 serves to mount a plurality of illuminating lamps 56 by means of which the indicating scales are illuminated when it is desired to operate the camera. The plate 52 forms the necessary light shield to prevent light emanating from the illuminating lamps 56 from impinging directly upon the film within the camera.

Positioned behind the camera 50, i.e., to the right thereof as viewed in Figure 1, is a timer 58 and positioned to the right of the timer 58, as viewed in Figure 1, are a plurality of batteries 60 providing the power supply for the instrument. The gyroscope, the clock, the pendulous member 48, the camera and the timer may be selected from any of numerous well known devices of these types and thus need not be described in detail herein. Similarly, the wiring system connecting the batteries and the timer with the camera and the illuminating lamps are entirely conventional and would be obvious to one skilled in the art. It is sufficient to note that, by means of suitable wiring, the timer 58 serves to energize the illuminating lamps and to energize the camera for brief periods at intervals of, for example, every fifteen seconds. Thus the camera will produce a plurality of recordings of the positions of the various indicating scales during a brief period every fifteen seconds. This period is sufficient to provide a plurality of photographic recordings at least one of which will provide a clear record of the positions of the various indicating scales.

From the foregoing it will be evident that the weight of the batteries and the instruments carried by the pendulous cradle formed by the plates 28, 26 and 24 will serve to maintain the cradle with the plates 28 lying in vertical planes as the instrument is drawn through a pipe line following an irregular path. Thus the pendulous member 38 will always hang in a vertical plane and the indication of inclination provided by the scales 46 and 48 will be accurate.

If desired, the pendulous member may be formed of hemispherical shape as shown at 70 in Figure 4 and have its curved lower surface provided with vanes 72 immersed in oil 74 within a container 76 to provide dampening of the pendulum. Thus the time intervals during which photographs are taken may be minimized and clear recordings obtained.

The sleeve 4 which is in sealed relation with the end discs 8 provides, as previously noted, a pressure tight chamber protecting the instruments from liquids or gases contained within a pipe line being surveyed. If the pipe line being surveyed carries an explosive gas under pressure, the sleeve 4 may, if desired, be filled with an inert gas under pressure as an added safety measure.

In operation, the apparatus is pulled through a length of pipe line or other horizontally extending bore which is to be surveyed. By means of two cables 20, the device may be positioned successively along the length of the bore and the time at which the instrument occupies each position may be noted on a clock which is synchronized with the clock 37 contained within the instrument. After the apparatus is pulled through the pipe in one direction, it may be then pulled backwardly through the pipe in the other direction and a duplicate set of recordings made in each position in which recordings were originally made. Thus, two complete surveys are provided which may be checked against each other for accuracy. From the recordings made by the instrument, a horizontal and vertical projection of the course of the pipe line may be laid out and the position of the pipe line thus determined.

What is claimed is:

Horizontal bore surveying apparatus comprising means for indicating azimuthal deviations, vertical deviations and time, means for recording said indications, an elongated housing, pendulous means pivoted on an axis extending longitudinally of said housing supporting said indicating and recording means within said housing, and means for passing said supporting means through a horizontal bore to be surveyed, said indicating means comprising a gyroscope including a scale for azimuthal indications, a pendulous member including a scale for vertical indications, and a clock including a scale for indicating time, said recording means comprising a camera positioned to photograph said scales, illuminating means to illuminate said scales, and means periodically operating said camera and said lamps to produce photographs of the indications of said scales at various times, said scales all being arranged in substantially adjacent positions in planes extending transversely of said housing, and said camera being positioned to photograph all of said scales with each exposure.

References Cited in the file of this patent

UNITED STATES PATENTS

| | | |
|---|---|---|
| 2,619,728 | Ely | Dec. 2, 1952 |
| 2,699,611 | Norden | Jan. 18, 1955 |

FOREIGN PATENTS

| | | |
|---|---|---|
| 7,797 | Great Britain | 1906 |
| 230,860 | Germany | Feb. 7, 1911 |
| 245,698 | Great Britain | Jan. 11, 1926 |